2,817,662

3,6-BIS-(ALIPHATIC FLUOROHYDROCARBON)-s-TETRAZINES, THEIR 1,2-DIHYDRO DERIVATIVES AND METHODS FOR THEIR PREPARATION

Rudolph A. Carboni, Wilmington, Del., assignor to E. I. du Pont de Nemours and Company, Wilmington, Del., a corporation of Delaware No Drawing. Application April 20, 1956
Serial No. 579,432

21 Claims. (Cl. 260—241)

This invention relates to novel fluorine-containing heterocyclic nitrogen compounds and methods for their preparation. More particularly, this invention relates to new fluorine-containing derivatives of s-tetrazine and to novel methods for their preparation.

Symmetrical tetrazine, represented by the structural formula

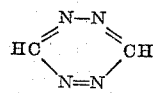

and 1,2-dihydro-s-tetrazine, represented by the structural formula

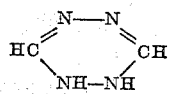

are known products. There have also been described in the literature s-tetrazine and 1,2-dihydro-s-tetrazine substituted with hydrocarbon groups, such as alkyl, at the 3,6-positions. However, no tetrazine or dihydrotetrazine substituted with groups containing fluorine have heretofore been described.

It is an object of this invention to provide new fluorine-containing heterocyclic nitrogen compounds and methods for their preparation. A further object is to provide new fluorine-containing derivatives of s-tetrazine and novel methods for their preparation. Another object is to prepare new fluorine-containing derivatives of s-tetrazine by a novel method which is much simpler than the known methods of synthesizing the hydrocarbon substituted derivatives of s-tetrazine. Other objects will appear hereinafter.

These and other objects of this invention are accomplished by providing the new fluorine-containing derivatives of s-tetrazine represented by the formula:

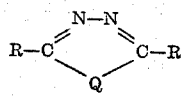

where Q is one of the atomic groupings, (i. e., divalent radicals), —N=N— and —NH—NH— and R is a fluoroalkyl or fluoroalkenyl radical wherein the alpha carbon atom, i. e., the carbon atom adjacent to the tetrazine ring, bears at least one hydrogen atom. The new products of this invention are 3,6-disubstituted-s-tetrazines and 1,2-dihydro-3,6-disubstituted-s-tetrazines wherein the substituents are fluoroalkyl or fluoroalkenyl radicals having at least one hydrogen atom attached to the carbon atom adjacent to the tetrazine ring.

The 3,6-bis-fluoroalkyl-s-tetrazines and 3,6-bis-fluoroalkenyl-s-tetrazines of this invention can be represented by the formula

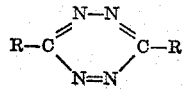

where R is a fluoroalkyl or fluoroalkenyl radical in which the carbon atom alpha to the tetrazine ring bears at least one hydrogen atom.

The 1,2 - dihydro-3,6-bis-fluoroalkyl-s-tetrazines and 1,2-dihydro-3,6-bis-fluoroalkenyl-s-tetrazines of this invention can be represented by the formula

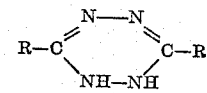

where R is a fluoroalkyl or fluoroalkenyl radical in which the carbon atom alpha to the tetrazine ring bears at least one hydrogen atom.

The new fluorine-containing derivatives of s-tetrazine of this invention are prepared by a new reaction which comprises bringing into contact and reacting a 1,1-difluoro-1-alkene having at least one other fluorine atom in its molecule and having fluorine as the sole substituent with at least one molar equivalent of hydrazine and obtaining as the resulting product a 3,6-bis(aliphatic fluorohydrocarbon) derivative of s-tetrazine with liberation of hydrofluoric acid. There is formed a 1,2-dihydro-3,6-bis(aliphatic fluorohydrocarbon)-s-tetrazine, i. e., a 1,2-dihydro-3,6-bis-fluoroalkyl (or fluoroalkenyl)-s-tetrazine which can be separated as the resulting product or it can be oxidized to the corresponding 3,6-bis(aliphatic fluorohydrocarbon)-s-tetrazine, i. e., 3,6-bis-fluoroalkyl (or fluoroalkenyl)-s-tetrazine.

The fluoroolefins suitable for use in this reaction can be represented by the formula

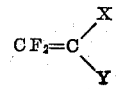

where X is hydrogen or fluorine and Y is fluorine, alkyl, fluoroalkyl or fluoroalkenyl, with the proviso that when Y is alkyl X is fluorine, so that the fluoroolefin always contains at least one fluorine atom in addition to the terminal difluoromethylene group.

The reaction can be represented by the following equation, using tetrafluoroethylene as the illustrative 1,1-difluoro-1-alkene:

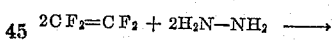
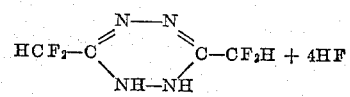

If the tetrazine is desired, the 1,2-dihydro-s-tetrazine so obtained is oxidized with the help of any suitable oxidizing agent in accordance with the equation:

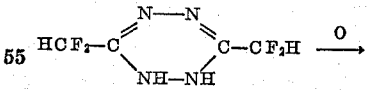
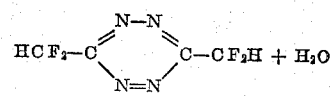

The reaction presumably proceeds through the intermediate formation of an alpha-fluorohydrazone as follows:

$$CF_2=CF_2+NH_2—NH_2 \rightarrow HCF_2—CF=N—NH_2+HF$$

Using the general formula for the fluoroolefin, the reaction for preparation of the alpha-fluorohydrazone can be illustrated as follows:

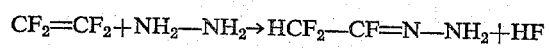
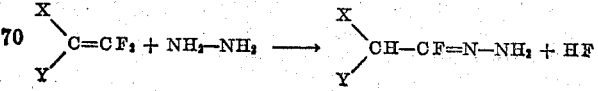

At any rate, the alpha-fluorohydrazone is often found as a reaction product, and the reaction can even be controlled so as to make it the predominant product. However, the alpha-fluorohydrazone can be readily converted to the corresponding 1,2-dihydro-3,6-disubstituted-s-tetrazine, as will be described later.

The products of this invention, whose substituents will for convenience be referred to hereinafter as fluoroalk-(en)yl radicals, are crystalline solids or high boiling liquids of good stability under normal conditions. The 1,2-dihydro-3,6-bis-fluoroalk(en)yl-s-tetrazines are light yellow in color. When subjected to the influence of an oxidizing agent they are readily converted to the corresponding 3,6-bis-fluoroalk(en)yl-s-tetrazines, which are colored deep red or magenta, and are characterized by high volatility.

The structure of the dihydrotetrazines as the 1,2-dihydro compounds rather than, for example, the 1,4-dihydrotetrazines, has been established through their ready oxidation to s-tetrazines and through the concordant evidence of infrared spectra, ultraviolet spectra and nuclear magnetic resonance spectra.

In the synthesis of these products according to the new method of this invention, anhydrous hydrazine can be used but it is preferable to use hydrazine hydrate, $NH_2-NH_2.H_2O$, since the presence of water in the reaction mixture leads to higher yields of the dihydrotetrazine.

While hydrazine or its hydrate can be used without added solvent or diluent, it is preferable to use a liquid reaction medium. For thus purpose, any liquid which is substantially chemically inert toward the reactants and reaction products can be used, but it has been found that, in order to obtain maximum yields of the dihydrotetrazine the reaction medium should be a polar liquid, that is, a liquid which produces electrically conducting solutions.

Suitable polar liquids for use in this process include water, alcohols (e. g., methanol, ethanol, proponal, cyclohexanol, etc.), dimethylformamide, dimethylacetamide, and the like. When non-polar liquids (e. g., diethyl ether, di-n-butyl ether, dioxane, carbon disulfide, chloroform, benzene, and the like) are used, there is much less tetrazine derivative formed, the product consisting largely, sometimes almost exclusively, of the alpha-fluorohydrazone.

It is recommended to use at least one mole of hydrazine per mole of 1,1-difluoro-1-alkene. This can be done by mixing the whole of the reactants in this proportion, or by adding the difluoroalkene gradually to the hydrazine. The latter procedure is particularly convenient when the difluoroalkene is gaseous.

The reaction is attended by the formation of two moles of hydrogen fluoride per mole of difluoroalkene. It is not essential to neutralize all, or even any, of this hydrogen fluoride, but it is however desirable to do so, at least partially. For this purpose, it is convenient to use an excess of hydrazine. For complete neutralization of the hydrogen fluoride, a molar ratio of two moles of hydrazine per mole of difluoroalkene is required, and this amount of hydrazine is conveniently used. However, a lower molar ratio of hydrazine to difluoroalkene, down to 1:1, can be used. In fact, it may be desirable to have some free hydrogen fluoride present since, as will be shown later, it is an effective agent for the conversion of the alpha-fluorohydrazone to the 1,2-dihydro-s-tetrazine. Other acid acceptors besides excess hydrazine can be used, provided they are substantially unreactive toward the difluoroalkene. Such acceptors include, for example, sodium bicarbonate, sodium carbonate, calcium hydroxide, triethylamine, pyridine, etc.

The reaction temperature is not critical. With the more reactive difluoroalkenes, the reaction is exothermic and may require control by cooling in the early stages. A generally favorable temperature range is that between 0 and 100° C., although lower (e. g., —5 to —10° C.) or higher (e. g., 120–150° C.) temperatures can be used. The progress of the reaction can often be followed by the increase in the amount of the fluoride salt of the acid acceptor, such as hydrazinium fluoride. In general, the reaction is substantially completed in two to six hours at the operating temperature.

The reaction product is best isolated by preliminary removal of any hydrofluoric acid salt present and extraction of the organic material with a suitable solvent. The 1,2-dihydro-3,6-bis-fluoroalk(en)yl-s-tetrazine is sublimed or recrystallized from an appropriate solvent or both sublimed and recrystallized.

If it is desired to obtain the corresponding tetrazine, the 1,2-dihydrotetrazine is oxidized by treatment with any conventional oxidizing agent such as chlorine, ferric chloride, hydrogen peroxide, or oxidizing inorganic acid, such as nitric acid, nitrous acid, chromic acid, and the like. Oxidation reactions of this type have been used and described previously in connection with the 3,6-dihydrocarbon substituted-1,2-dihydro-s-tetrazines. The resulting tetrazine is isolated by distillation or recrystallization or by both distillation and recrystallization.

As already noted, the reaction may yield, in part at least, an alpha-fluorohydrazone of the formula

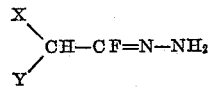

particularly when the difluoroalkene

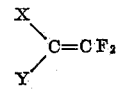

is reacted with hydrazine in a non-polar solvent or diluent. In these formulas X is hydrogen or fluorine and Y is fluorine, alkyl, fluoroalkyl or fluoroalkenyl, with the proviso that when Y is alkyl, X is fluorine. The tendency to form the alpha-fluorohydrazone appears to depend, at least in part, on the nature of the difluoroalkene. For example, it is particularly marked with hexafluoropropene, although it is believed that the alpha-fluorohydrazone is the initial reaction product, more or less transitory, in all cases.

As will be shown in the following examples, the alpha-fluorohydrazone is very readily convertible through dimerization with attendant loss of hydrogen fluoride, to the corresponding 1,2-dihydro-s-tetrazine. This can be done simply by allowing the alpha-fluorohydrazone to stand at room temperature for a few days or weeks, or it can be done very rapidly by heating it, e. g., by distilling the reaction product, or by treating it with warm acetic acid or with a catalytic amount of aqueous hydrofluoric acid. Thus, the formation of the alpha-fluorohydrazone is no disadvantage in this process. It should be noted also that the alpha-fluorohydrazones can be converted directly to the tetrazines without isolating the intermediate 1,2-dihydrotetrazines. This can be done by reacting the alpha-fluorohydrazone with nitric acid, whereby the 3,6-bis-fluoroalk(en)yl-s-tetrazine is obtained directly.

It is noteworthy that the reaction leading to the 1,2-dihydro-3,6-bis-fluoroalk(en)yl-s-tetrazines is specific to hydrazine itself and is not observed with substituted hydrazines such as phenylhydrazine or semicarbazide. With such substituted hydrazines the reaction proceeds only to the corresponding N-substituted alpha-fluorohydrazone.

The following examples illustrate the invention.

*Example I*

A mixture of 12.8 g. (0.22 mole) of an 85% aqueous solution of hydrazine hydrate, 25 g. (0.167 mole) of hexafluoropropene, $CF_3-CF=CF_2$, 15 g. of borax and 80 ml. of dioxane was heated in a silver-lined bomb tube at 135° C. for 6 hours. The dark reaction mixture was filtered and the solvent removed from the filtrate by distillation. A higher boiling liquid (10.2 g.) boiling at 40–48° C. at 69 mm., $n_D^{25}$ 1.3895, was obtained by fractionation of the residue. This product consisted chiefly of 2,3,3,3-tetrafluoropropionyl fluoride hydrazone

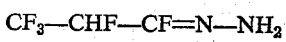

On redistillation of this product at atmospheric pressure, hydrogen fluoride began to be evolved from the liquid. The pressure was then reduced to 1–2 mm., whereupon a yellow solid sublimed throughout the condenser. This solid was collected with the aid of ether, which was then evaporated, and the solid residue was triturated with two portions of hot toluene. Each of the toluene solutions yielded a crop of yellow crystals having somewhat different melting points, 106–106.5° C. from the first and 126–130° C. from the second. However, the infrared spectra of these two substances were identical. These two substances were two crystalline modifications of the same product, 1,2-dihydro-3,6-bis-(1,2,2,2-tetrafluoroethyl)-s-tetrazine,

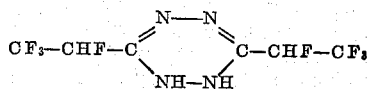

Analysis.—Calc'd for $C_6H_4F_8N_4$: C, 25.36; H, 1.42; F, 53.49; N, 19.72; M. W., 284. Found: C, 25.65; H, 1.71; F, 53.40; N, 19.40; M. M., 264.

The infrared, ultraviolet and nuclear magnetic resonance spectra were each found to be in agreement with this chemical structure. Treatment of this product with concentrated nitric acid immediately produced the red color characteristic of tetrazines.

*Example II*

A mixture of 50 g. (1 mole) of hydrazine hydrate, 75 g. (0.5 mole) of hexafluoropropene, $CF_3—CF=CF_2$, and 100 ml. of water was heated at 100° C' for 5 hours in a silver-lined bomb. The reaction product consisted of an aqueous layer and a black, water-insoluble semi-solid. Extraction of the latter with chloroform followed by concentration of the extract yielded the yellow, crystalline, 1,2 - dihydro - 3,6 - bis(1,2,2,2 - tetrafluoroethyl) - s-tetrazine, M. P. 104–109° C.

This product was treated with an oxidizing mixture of 2.0 g. of concentrated nitric acid, 2.0 g. of sulfuric acid and 5 ml. of water. The red color of the tetrazine appeared immediately. The mixture was heated periodically to about 100° C. over a 15-minute period. On cooling, a red crystalline solid formed. The solid was collected by filtration and recrystallized from petroleum ether, after which it melted at 67–70° C. This was 3,6-bis(1,2,2,2-tetrafluoroethyl)-s-tetrazine,

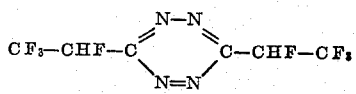

Analysis.—Calc'd for $C_6H_2F_8N_4$: C, 25.54; H, 0.71; F, 53.88; N, 19.86. Found: C, 26.02; H, 0.90; F, 53.47; N, 19.97.

Infrared, ultraviolet and nuclear magnetic resonance spectral analyses were in agreement with this chemical structure.

*Example III*

A reaction mixture identical to that used in Example II was placed in a silver-lined bomb and allowed to react at room temperature for 6 hours then at 50° C. for 4 hours. The reaction mixture was filtered and the solid was extracted with 500 ml. of ether, leaving an insoluble residue of hydrazinium fluoride. The ether extract was evaporated to dryness, leaving a crystalline solid residue which was sublimated at 115° C. and 15–20 mm. pressure.

There was obtained 29.3 g. (41% yield) of bright yellow crystals of 1,2-dihydro-3,6-bis(1,2,2,2-tetrafluoroethyl)-s-tetrazine. After one recrystallization from toluene it melted at 112–116° C. and a second recrystallization raised the melting point to 119–123° C. owing to the changing proportions of the two crystalline modifications. The ultraviolet spectrum of this product was identical to that of the product of Example I. It gave the same tetrazine as that of Example II on oxidation with a nitric acid-sulfuric acid mixture.

*Example IV*

A glass reaction bottle was charged with 50 g. of hydrazine hydrate and 100 ml. of absolute methanol. The bottle was closed, evacuated and pressured to 33 lb./sq. in. with hexafluoropropene. Absorption of the hexafluoropropene began immediately upon mechanical shaking of the bottle, and the exothermic nature of the reaction required cooling. The bottle was repressured as needed during 4 hours, after which no further absorption of the hexafluoropropene took place.

The insoluble hydrazinium fluoride was filtered off and the methanolic filtrate was concentrated to one-half of its original volume. A crop of 7.0 g. of yellow crystals of 1,2-dihydro-3,6-bis(1,2,2,2-tetrafluoroethyl)-s-tetrazine was obtained. An additional 9.4 g. was obtained by evaporating the alcoholic solution to dryness and subliming the residue. The product melted at 121–123° C. after recrystallization from toluene.

Analysis.—Calc'd for $C_6H_4F_8N_4$: C, 25.36; H, 1.42; F, 53.48; N, 19.72. Found: C, 25.73; H, 1.69; F, 53.53; N, 19.88.

The dihydrotetrazine obtained according to the foregoing examples can be oxidized to 3,6-bis(1,2,2,2-tetrafluoroethyl)-s-tetrazine by other procedures besides that already shown, e. g., by dissolving it in chloroform, bubbling chlorine for several hours through the solution heated to reflux, and evaporating the solvent. Nearly quantitative conversion to the tetrazine can be achieved by dissolving the dihydrotetrazine (6.5 g.) in 20 ml. of glacial acetic acid and adding to this solution 5 ml. of concentrated nitric acid dropwise over 2 or 3 minutes. The mixture turns red immediately and brown nitric oxide fumes are evolved. The mixture is then poured into 100 ml. of ice water with stirring. There is obtained 5.5 g. of the red 3,6-bis(1,2,2,2-tetrafluoroethyl)-s-tetrazine.

*Example V*

A silver-lined bomb tube charged with a mixture of 50 g. (1 mole) of hydrazine hydrate, 75 g. (0.5 mole) of hexafluoropropene and 100 ml. of diethyl ether was heated at 60° C. for 5 hours. The cooled reaction mixture was filtered to remove the ether-insoluble hydrazinium fluoride, and the ether was removed from the filtrate by distillation at atmospheric pressure. Fractionation of the residual liquid yielded 54 g. of 2,3,3,3-tetrafluoropropionyl fluoride hydrazone,

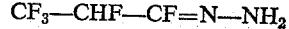

boiling at 58–60° C. at 147 mm., $n_D^{25}$ 1.3476.

Analysis.—Calc'd for $C_3H_3F_5N_2$: C, 22.23; H, 1.86; F, 58.62; N, 17.29; M. W., 162. Found: C, 22.76; H, 2.32; F, 58.12; N, 18.03; M. W., 164.

The infrared and nuclear magnetic resonance spectral analyses were in clear agreement with this chemical structure.

A portion of this material was transformed to 1,2-dihydro-3,6-bis(1,2,2,2-tetrafluoroethyl)-s-tetrazine in nearly quantitative yield by standing for one month at room temperature. Conversion to the dihydrotetrazine can also be achieved in the following ways:

(a) A 1.0 g. sample of the alpha-fluorohydrazone was heated at 70° C. in acetic acid for 5 minutes, and the solution was poured in ice water. There was obtained 0.72 g. of 1,2-dihydro-3,6-bis(1,2,2,2-tetrafluoroethyl)-s-tetrazine.

(b) A 0.5 g. sample of the alpha-fluorohydrazone was treated with two drops of 40% aqueous hydrofluoric acid. An immediate reaction occurred, yielding 1,2-dihydro-3,6-bis-(1, 2, 2, 2-tetrafluoroethyl)-s-tetrazine.

The alpha-fluorohydrazone can also be converted directly to 3,6-bis(1,2,2,2-tetrafluoroethyl)-s-tetrazine, without isolating the intermediate dihydrotetrazine, by treating it with concentrated nitric acid.

Example VI

A solution of 18 g. of hydrazine hydrate in 25 ml. of dimethylformamide was placed in a pressure bottle which was pressured with tetrafluoroethylene at 40 lb./sq. in. and mechanically shaken. The solution absorbed 12 g. of tetrafluoroethylene. The reaction was slightly exothermic, but no cooling was necessary. The reaction product, which consisted of two liquid phases, was extracted with ether and the ether extract was washed with water. Evaporation of the ether gave 3 g. of an oily solid which on recrystallization from water gave 1,2-dihydro-3,6-bis(difluoromethyl)-s-tetrazine,

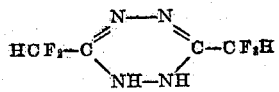

as yellow crystals melting at 95–97° C.

*Analysis.*—Calc'd for $C_4H_4F_4N_4$: F, 41.3; N, 30.4. Found: F, 38.5; N, 30.4.

The nuclear magnetic resonance spectrum was consistent with this chemical structure. Oxidation with concentrated nitric acid gave at once the red color characteristic of the s-tetrazine structure indicating transformation to the corresponding 3,6-bis(difluoromethyl)-s-tetrazine.

Example VII

A mixture of 10 g. of hydrazine hydrate and 30 ml. of dimethylformamide was cooled to 5° C. To the stirred mixture was added 12.6 g. of 1,1,4,4-tetrafluoro-1,3-butadiene, $CF_2=CH—CH=CF_2$, during the course of 10 minutes. The reaction mixture was then stirred at 5° C. for half an hour and then at 25° C. for 1.5 hours. The precipitated white solid (hydrazinium fluoride) was removed by filtration, the filtrate was diluted with 60 ml. of water and the resulting solution was warmed to 90° C. On cooling to 0° C., light yellow crystals of 1,2-dihydro-3,6-bis(3,3-difluoroallyl)-s-tetrazine,

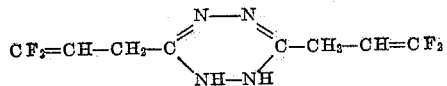

separated. Crystallization from a mixture of methanol and water gave the pure compound, melting at 130–132° C.

*Analysis.*—Calc'd for $C_8H_8F_4N_4$: C, 40.66; H, 3.42; N, 23.74. Found: C, 40.91; H, 3.69; N, 24.30.

A sample of this product was dissolved in 20 cc. of glacial acetic acid and 2.5 cc. of nitric acid (sp. gr. 1.42) was added slowly, keeping the temperature below 30° C. After 15 minutes, the reaction mixture was diluted with water and the solution was extracted with ether. The ether extract was washed with aqueous sodium bicarbonate until neutral, dried and concentrated. Distillation of the residue gave 3,6-bis(3,3-difluoroallyl)-s-tetrazine,

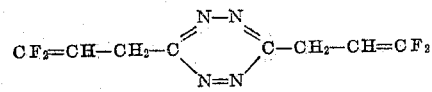

as a magenta-colored liquid boiling at 75–80° C. at 1 mm. pressure.

*Analysis.*—Calc'd for $C_8H_6F_4N_4$: C, 41.01; H, 2.58; N, 23.94. Found: C, 41.45; H, 2.82; N, 23.36.

The 1,1,4,4-tetrafluoro-1,3-butadiene used in this example can be prepared by the process described in U. S. patent application of Anderson Ser. No. 498,778, filed April 1, 1955, now U. S. Patent 2,743,303, issued April 24, 1956, or by pyrolysis at temperatures in the range of 350–900° C., of 3,3,4,4-tetrafluorocyclobutene, itself prepared by the process of U. S. Patent 2,462,345, issued February 22, 1949.

While this invention has been illustrated with reference to the reaction of hydrazine with certain specific fluoroolefins, and the resulting reaction products, it is to be understood that this invention embraces as new products the 3,6-disubstituted-s-tetrazines and the 3,6-disubstituted-s-1,2-dihydrotetrazines where the substituents are fluoroalkyl or fluoroalkenyl radicals having at least one hydrogen atom attached to the carbon atom adjacent to the tetrazine ring. Because of the greater accessibility of the starting fluoroolefins, the most useful such compounds are those in which the substituent radicals have from 1 to 13 carbon atoms, i. e., are derived from fluoroolefins having from 2 to 14 carbon atoms. Moreover, and again for reasons of greater accessibility of the corresponding fluoroolefins, the preferred products are those in which the substituents are saturated radicals containing at least two fluorine atoms. Thus, the preferred compounds are 3,6-polyfluoroalkyl-s-tetrazines and 1,2-dihydro-3,6-polyfluoroalkyl-s-tetrazines.

Any 1,1-difluoro-1-alkene having at least one other fluorine atom, and which is hydrocarbon except for any fluorine atoms present, can be used in the process of the invention. The most accessible of these materials are the monoalkenes containing at least four fluorine atoms, and these are therefore particularly preferred. Still more preferred are the fluoromonoalkenes containing from two to fourteen carbon atoms and at least four fluorine atoms. However, other fluoroalkenes can be employed, such as the fluorodiolefins.

Thus, in addition to the fluoroolefins illustrated in the foregoing examples, there can be used trifluoroethylene, $CF_2=CFH$; 1,1,3,3,3-pentafluoropropene-1, $CF_2=CH—CF_3$; perfluorobutene-1, $C_2F_5—CF=CF_2$; perfluoroheptene-1, $C_5F_{11}—CF=CF_2$; 8-hydroperfluorooctene-1, $H(CF_2)_6—CF=CF_2$; 12-hydroperfluorododecene-1, $H(CF_2)_{10}—CF=CF_2$; the alkyltrifluoroethylenes obtained by reacting alkyllithiums with tetrafluoroethylene, such as methyltrifluoroethylene, $CH_3—CF=CF_2$; n-butyltrifluoroethylene, $C_4H_9—CF=CF_2$; n-dodecyltrifluoroethylene, $C_{12}H_{25}—CF=CF_2$; the fluorobutadienes obtained by pyrolysis in the range of 350–900° C. of the corresponding 3,3,4,4-tetrafluorocyclobutenes, such as 1,1,2,4,4-pentafluoro-1,3-butadiene, $CF_2=CF—CH=CF_2$; 2-methyl-1,1,4,4-tetrafluoro-1,3-butadiene

and the like.

By using the process of this invention as described, the above-listed fluoroolefins lead, respectively, to the 1,2-dihydro-3,6-disubstituted-s-tetrazines whose names are given below with the formula of the 3,6-substituents, and to the corresponding, 3,6-disubstituted-s-tetrazines: 1,2 - dihydro-3,6-bis(fluoromethyl)-s-tetrazine, $CH_2F$—; 1,2-dihydro - 3,6 - bis(2,2,2 - trifluoroethyl) - s - tetrazine, $CF_3—CH_2$—; 1,2 - dihydro - 3,6 - bis(1 - hydroperfluoropropyl)-s-tetrazine, $C_2F_5—CFH$—; 1,2-dihydro-3,6-bis-(1 - hydroperfluorohexyl) - s - tetrazine, $C_5F_{11}—CFH$—; 1,2 - dihydro-3,6-bis(1,7-dihydroperfluoroheptyl)-s-tetrazine, $H(CF_2)_6—CFH$—; 1,2-dihydro-3,6-bis(1,11-dihydroperfluoroundecyl)-s-tetrazine, $H(CF_2)_{10}—CFH$—; 1,2-dihydro-3,6-bis(1-fluoroethyl)-s-tetrazine, $CH_3—CFH$—; 1,2 - dihydro - 3,6 - bis(1 - fluoro-n-pentyl) - s - tetrazine, $C_4H_9—CFH$—; 1,2-dihydro-3,6-bis(1-fluoro-n-tri-decyl)-s-tetrazine, $C_{12}H_{25}—CFH$—; 1,2-dihydro-3,6-bis(2,3,3- trifluoroallyl)-s-tetrazine, $CF_2=CF-CH_2-$; 1,2-dihydro-3,6-bis(2-methyl-3,3-difluoroallyl)-s-tetrazine

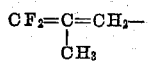

and the like.

The 1,2-dihydro-3,6-bis-fluoroalk(en)yl-s-tetrazines of this invention are useful as antioxidants and stabilizers for a number of natural and synthetic hydrocarbon polymers, such as rubber or poly-1,3-butadiene, and for vegetable oils, such as cottonseed oil, tung oil, linseed oil, olive oil and the like. For such uses, amounts as small as 0.0005–0.001% of the 1,2-dihydrotetrazine are effective. As an example, two samples of a commercial cooking oil consisting chiefly of cottonseed oil were sealed in glass containers and heated at 70° C. for three days. The first sample contained one part per thousand of 1,2-dihydro-3,6-bis(1,2,2,2-tetrafluoroethyl)-s-tetrazine, the second sample was a control. At the end of the test the control sample had become quite rancid, as shown by odor and taste, whereas the first sample was essentially unchanged.

The 3,6-bis-fluoroalk(en)yl-s-tetrazines are useful as photographic desensitizing agents. For example, treating a negative film with a 0.04% aqueous solution of 3,6-bis-(1,2,2,2-tetrafluoroethyl)-s-tetrazine decreases the light sensitivity to about half of that of a control film. Because of their intense color and high volatility, the 3,6-bis-fluoroalk(en)yl-s-tetrazines are also useful as temporary marking compositions (disappearing inks) for cloth, paper or other surfaces.

The 3,6-bis-fluoroalk(en)yl-s-tetrazines react readily with unsaturated compounds such as butadiene, isoprene, 2,3-dimethylbutadiene, styrene or alphamethyl styrene at room temperature or below with evolution of nitrogen. At higher temperatures, allene and cyclohexene also react with evolution of nitrogen. The products of these reactions are crystalline solids or distillable liquids and they are formed by combination of one molecule of each of the reactants with loss of one molecule of nitrogen. These products are substituted pyridazines, whose formation is accounted for by a reaction scheme in which the tetrazine functions as a diene while the olefin acts as a dienophile. For example, the reaction product of 3,6-bis(1,2,2,2-tetrafluoroethyl)-s-tetrazine with allene has been identified as 3,6-bis(1,2,2,2-tetrafluoroethyl)-4-methyl pyridazine,

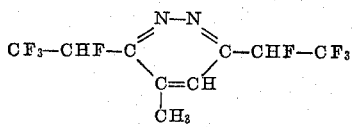

This method constitutes a new synthetic route to pyridiazine derivatives.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A fluorine-containing derivative of s-tetrazine represented by the formula

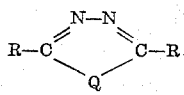

where Q is a divalent radical selected from the class consisting of —N=N— and —NH—NH— and R is selected from the class consisting of fluoroalkyl and fluoroalkenyl radicals containing not more than 13 carbon atoms and in which the carbon atom alpha to the tetrazine ring bears at least one hydrogen atom.

2. A 3,6-bis-fluoroalkyl-s-tetrazine in which each fluoroalkyl radical contains not more than 13 carbon atoms and has at least one hydrogen atom attached to the carbon atom alpha to the tetrazine ring.

3. A 3,6-bis-fluoroalkenyl-s-tetrazine in which each fluoroalkenyl radical contains not more than 13 carbon atoms and has at least one hydrogen atom attached to the carbon atom alpha to the tetrazine ring.

4. A 1,2-dihydro - 3,6 - bis - fluoroalkyl-s-tetrazine in which each fluoroalkyl radical contains not more than 13 carbon atoms and has at least one hydrogen atom attached to the carbon atom alpha to the tetrazine ring.

5. A 1,2-dihydro-3,6-bis-fluoroalkenyl - s - tetrazine in which each fluoroalkenyl radical contains not more than 13 carbon atoms and has at least one hydrogen atom attached to the carbon atom alpha to the tetrazine ring.

6. Process for preparing a fluorine-containing derivative of s-tetrazine which comprises bringing into contact and reacting a 1,1-difluoro-1-alkene having at least one other fluorine atom in its molecule and having fluorine as the sole substituent with at least one molar equivalent of hydrazine, and separating as the resulting product a 1,2 - dihydro-3,6-bis(aliphatic fluorohydrocarbon)-s-tetrazine derivative of s-tetrazine.

7. Process for preparing a fluorine-containing derivative of s-tetrazine which comprises bringing into contact and reacting, in an inert polar liquid reaction medium, a 1,1-difluoro-1-alkene of 2 to 14 carbon atoms having at least one other fluorine atom in its molecule and having fluorine as the sole substituent with at least one molar equivalent of hydrazine, and separating as the resulting product a 1,2-dihydro-3,6-bis(aliphatic fluorohydrocarbon)-s-tetrazine.

8. Process for preparing a fluorine-containing derivative of s-tetrazine as set forth in claim 7 wherein said inert polar liquid reaction medium is water.

9. Process for preparing a fluorine-containing derivative of s-tetrazine which comprises bringing into contact and reacting a 1,1-difluoro-1-alkene having at least one other fluorine atom in its molecule and having fluorine as the sole substituent with at least one molar equivalent of hydrazine, oxidizing the reaction product thus formed, and separating as the resulting product a 3,6-bis(aliphatic fluorohydrocarbon)-s-tetrazine.

10. Process for preparing a fluorine-containing derivative of s-tetrazine which comprises bringing into contact and reacting, in an inert polar liquid reaction medium, a 1,1-difluoro-1-monoalkene of 2 to 14 carbon atoms having at least one other fluorine atom in its molecule and having fluorine as the sole substituent with at least one molar equivalent of hydrazine, and separating as the resulting product a 1,2-dihydro-3,6-bis-fluoroalkyl-s-tetrazine.

11. Process for preparing a fluorine-containing derivative of s-tetrazine which comprises bringing into contact and reacting a 1,1-difluoro-1-monoalkene of 2 to 14 carbon atoms having at least one other fluorine atom in its molecule and having fluorine as the sole substituent with at least one molar equivalent of hydrazine, oxidizing the reaction product thus formed, and separating as the resulting product a 3,6-bis-fluoroalkyl-s-tetrazine.

12. 3,6-bis(1,2,2,2-tetrafluoroethyl)-s-tetrazine.

13. 1,2 - dihydro - 3,6 - bis(1,2,2,2-tetrafluoroethyl)-s-tetrazine.

14. 1,2-dihydro-3,6-bis(difluoromethyl)-s-tetrazine.

15. 3,6-bis(3,3-difluoroallyl)-s-tetrazine.

16. 1,2-dihydro-3,6-bis(3,3-difluoroallyl)-s-tetrazine.

17. Process for preparing 1,2-dihydro-3,6-bis(1,2,2,2-tetrafluoroethyl)-s-tetrazine which comprises bringing into contact and reacting hexafluoropropene with at least one molar equivalent of hydrazine, and separating as the resulting product of 1,2-dihydro-3,6-bis(1,2,2,2-tetrafluoroethyl)-s-tetrazine.

18. Process for preparing 3,6-bis(1,2,2,2-tetrafluoroethyl)-s-tetrazine which comprises bringing into contact and reacting hexafluoropropene with at least one molar equivalent of hydrazine, oxidizing the reaction product thus formed, and separating as the resulting product 3,6-bis(1,2,2,2-tetrafluoroethyl)-s-tetrazine.

19. Process for preparing 1,2-dihydro-3,6-bis(difluoromethyl)-s-tetrazine which comprises bringing into contact and reacting tetrafluoroethylene with at least one molar equivalent of hydrazine, and separating as the resulting product 1,2-dihydro-3,6-bis(difluoromethyl)-s-tetrazine.

20. Process for preparing 1,2-dihydro-3,6-bis(3,3-difluoroallyl)-s-tetrazine which comprises bringing into contact and reacting 1,1,4,4-tetrafluoro-1,3-butadiene with at least one molar equivalent of hydrazine, and separating as the resulting product 1,2-dihydro-3,6-bis(3,3-difluoroallyl)-s-tetrazine.

21. Process for preparing 3,6-bis(3,3-difluoroallyl)-s-tetrazine which comprises bringing into contact and reacting 1,1,4,4-tetrafluoro-1,3-butadiene with at least one molar equivalent of hydrazine, oxidizing the reaction product thus formed, and separating as the resulting product 3,6-bis(3,3-difluoroallyl)-s-tetrazine.

No references cited.

U. S. DEPARTMENT OF COMMERCE

PATENT OFFICE

CERTIFICATE OF CORRECTION

Patent No. 2,817,662                                    December 24, 1957

Rudolph A. Carboni

It is hereby certified that error appears in the printed specification of the above numbered patent requiring correction and that the said Letters Patent should read as corrected below.

Column 5, line 29, for "M.M., 264." read -- M.W., 264. --; column 9, lines 3 to 5, for "$CF_2\!=\!\underset{CH_3}{C}\!=\!CH_2\text{-}$" read -- $CF_2\!=\!\underset{CH_3}{C}\!-\!CH_2\text{-}$ --; column 10, line 22, after "zine" insert a period; same line, strike out "derivative of s-tetrazine."; line 70, strike out "of".

Signed and sealed this 25th day of March 1958.

(SEAL)
Attest:

KARL H. AXLINE                                                          ROBERT C. WATSON

Attesting Officer                                          Commissioner of Patents